(12) United States Patent
Yamada

(10) Patent No.: US 8,641,081 B2
(45) Date of Patent: Feb. 4, 2014

(54) AIRBAG APPARATUS FOR A FRONT PASSENGER'S SEAT

(75) Inventor: Ikuo Yamada, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/526,635

(22) Filed: Jun. 19, 2012

(65) Prior Publication Data

US 2013/0001930 A1 Jan. 3, 2013

(30) Foreign Application Priority Data

Jun. 29, 2011 (JP) ................................ 2011-144505

(51) Int. Cl.
*B60R 21/20* (2011.01)
*B60R 21/205* (2011.01)

(52) U.S. Cl.
USPC ...................................... 280/728.2; 280/732

(58) Field of Classification Search
USPC ............................................. 280/728.2, 732
See application file for complete search history.

(56) References Cited

U.S. PATENT DOCUMENTS

| | | | | |
|---|---|---|---|---|
| 5,263,739 A | * | 11/1993 | Webber et al. ............. | 280/728.2 |
| 5,351,987 A | * | 10/1994 | Donegan et al. ........... | 280/728.2 |
| 5,468,011 A | * | 11/1995 | Donegan et al. ........... | 280/728.2 |
| 5,851,023 A | * | 12/1998 | Nagata et al. .............. | 280/728.3 |
| 6,796,582 B2 | * | 9/2004 | Scholz .......................... | 280/741 |
| 8,286,992 B2 | * | 10/2012 | Wagner et al. ............. | 280/728.2 |
| 2006/0125212 A1 | * | 6/2006 | Kretzschmar et al. ..... | 280/728.2 |
| 2007/0176398 A1 | * | 8/2007 | Vigeant et al. ............. | 280/728.2 |
| 2009/0189372 A1 | * | 7/2009 | Kashiwagi et al. ........ | 280/728.2 |

FOREIGN PATENT DOCUMENTS

| | | |
|---|---|---|
| JP | A-2001-270411 | 10/2001 |
| JP | A-2009-179156 | 8/2009 |

* cited by examiner

*Primary Examiner* — James English
(74) *Attorney, Agent, or Firm* — Posz Law Group, PLC

(57) ABSTRACT

A passenger airbag apparatus includes an airbag, an inflator, a case and a retainer. The case includes on a bottom wall a set-in opening through which the inflator is set in, a housing region that holds and houses the inflator, a mounting seat on which the airbag is mounted, lateral movement stopping sections that prevent the inflator from moving in an axial direction, and a rotation stopping section that prevents the inflator from rotating in a circumferential direction. The inflator includes a cut-out region engageable with the rotation stopping section. The retainer is secured to the mounting seats of the case with bolts while pressing a hem of an opening of the airbag against an upper circumferential plane of the inflator and the mounting seats, thus mounting the airbag and inflator on the case.

8 Claims, 10 Drawing Sheets

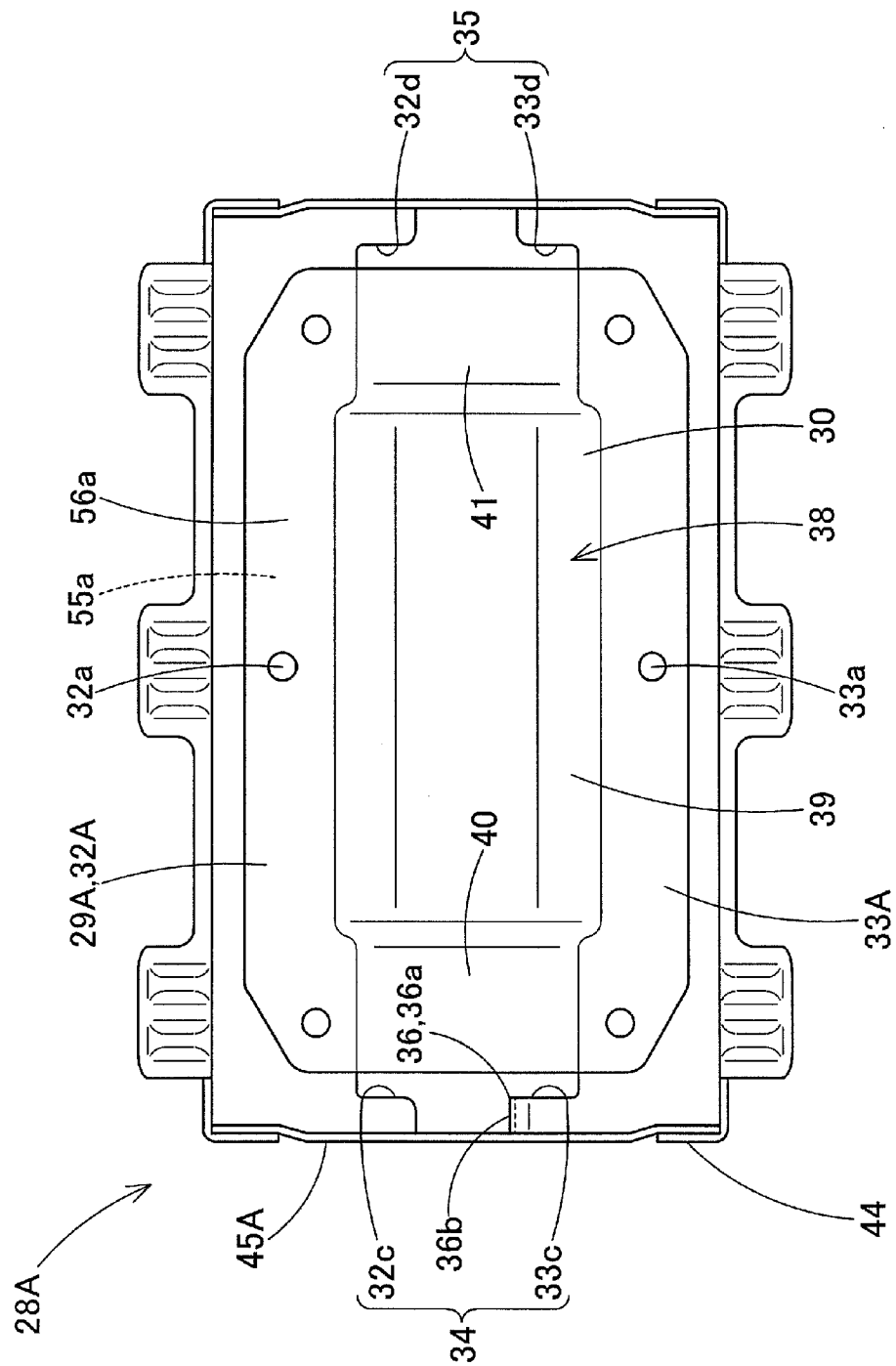

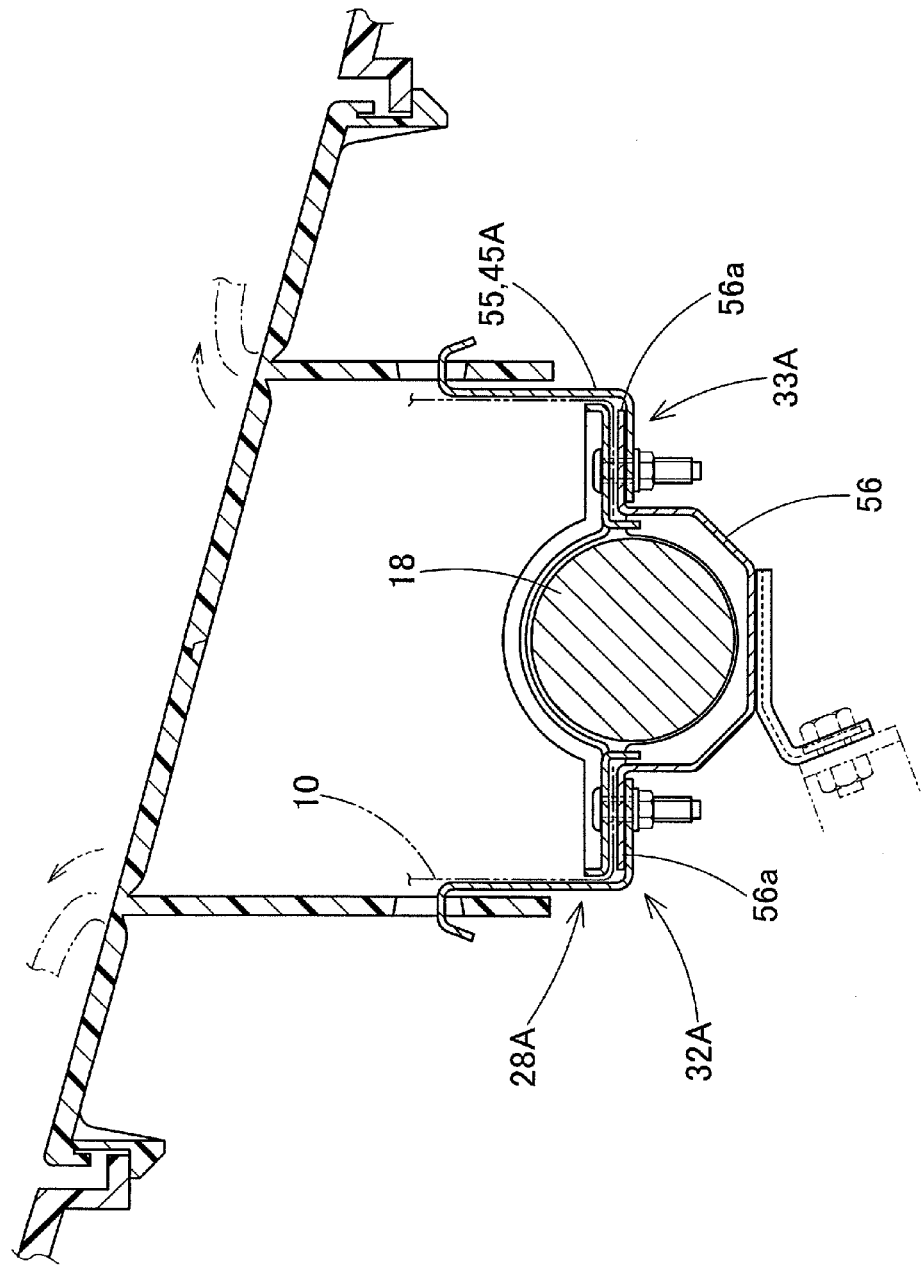

AIRBAG APPARATUS FOR A FRONT PASSENGER'S SEAT

CROSS REFERENCE TO RELATED APPLICATIONS

The Present application claims priority from Japanese Patent Application No. 2011-144505 of Yamada, filed on Jun. 29, 2011, the disclosure of which is hereby incorporated into the present application by reference.

BACKGROUND OF THE INVENTION

1. Field of the Invention

The present invention relates to a passenger airbag apparatus adapted to be mounted in front of a front passenger's seat of a vehicle.

2. Description of Related Art

As disclosed in JP 2009-179156 A and JP 2001-270411 A, a known passenger airbag apparatus includes an airbag, an inflator formed into a cylinder for supplying the airbag with an inflation gas and a case made of sheet metal, for housing the airbag and inflator.

In an airbag apparatus disclosed in the former reference, the inflator is secured to the case through the use of a stopper plate that is welded to the case and a securing fixture that is bolt fixed to the case. The stopper plate receives a non-cylindrical, deformed shaft of a first end of the inflator and prevents the shaft center of the inflator from rotating in a circumferential direction. The stopper plate and the securing fixture, which is located to face a second end of the inflator, fix the positions of the end planes of the inflator and prevent the inflator from moving in an axial direction. With this configuration, however, the securing fixture has to be attached to the case in addition to a retainer for securing an airbag to the case, which increases a number of parts of the apparatus as well as a number of processes of mounting the inflator on the case.

In an airbag apparatus of the latter reference, the inflator has a mounting bolt at a first end and a large flange at a second end. A case includes a large opening and a small opening such that the inflator penetrates through those openings to be set in the case. At mounting of the inflator, specifically, the first end of the inflator having the mounting bolt is inserted through the large opening until the bolt reaches the small opening and protrudes out of there whereas the flange abuts against the periphery of the large opening. The mounting bolt is nut fastened such that the inflator is assembled with the case. The inflator in the former reference is mounted on the case in a similar fashion as well. However, this mounting fashion requires a confirmation whether the leading end of the inflator finally protrudes out of the case, and the confirmation complicates the mounting work.

SUMMARY OF THE INVENTION

An object of the present invention is to provide an airbag apparatus for a front passenger's seat that has a limited number of parts and facilitates the mounting work of an inflator on a case.

The airbag apparatus for a front passenger's seat of the invention includes an airbag, a cylindrical inflator for supplying the airbag with an inflation gas, a case for housing the airbag and inflator, and a retainer for mounting the airbag to the case.

The airbag includes a generally rectangular opening for taking an inflation gas therein.

The case is made of sheet metal and is formed into a top-open box that includes a bottom wall and a circumferential wall extending in a tubular fashion from an outer peripheral edge of the bottom wall.

The bottom wall includes a set-in opening, a housing region for housing the inflator, mounting seats on which the airbag is mounted, lateral movement stopping sections and a rotation stopping section. The set-in opening is opened in a generally identical contour to an outer contour of the inflator as laid along a left and right direction and viewed from above. The housing region is recessed from front and rear peripheries of the set-in opening in a generally half-pipe fashion and supports lower circumferential planes of opposite ends of the inflator with left and right end regions of inner surfaces of the housing region. The mounting seats are located in the front and rear peripheries of the set-in opening.

The lateral movement stopping sections position opposite end planes of the inflator set in the housing region and prevent the inflator from moving in an axial direction. The lateral movement stopping sections are located on end planes of sheet metal material extending from the mounting seats at left and right peripheries of the set-in opening.

The rotation stopping section prevents the inflator from rotating in a circumferential direction about an axial center. The rotation stopping section is comprised of a sheet metal region extending from the mounting seat in at least either left or right periphery of the set-in opening, for engagement with a cut-out region of the inflator. The cut-out region is formed on an outer circumferential plane of a vicinity of an end plane of the inflator and is cut out along an up and down direction.

The retainer secures the airbag and inflator to the case. The retainer is generally square annular in contour and includes flat plate sections that are located at front and rear sides and formed respectively into a flat plate according to figures of the mounting seats of the case, and curved sections that are located on left and right sides and curved according to figures of upper circumferential planes of vicinities of opposite end regions of the inflator. The retainer is mounted on the mounting seats with securing means while pressing a generally square annular mounting area in a hem of the opening of the airbag against the upper circumferential planes of the vicinities of the opposite end regions of the inflator and the mounting seats of the case.

In the airbag apparatus of the invention, the inflator is set in the housing region of the bottom wall of the case from above via an opening of the circumferential wall. Subsequently, the retainer is allocated on the hem of the opening of the airbag and is set in the case from above via the opening of the circumferential wall of the case. Then if the retainer is secured to the mounting seats with the securing means while pressing a square annular mounting area in the opening hem of the airbag against the upper circumferences of the inflator in the vicinities of the end areas and the mounting seats of the case, the airbag and inflator are assembled with the case.

When the inflator is set in the housing region, the lateral movement stopping sections provided on the bottom wall of the case restrain the opposite end planes of the inflator and prevent the inflator from moving in an axial direction, whereas the rotation stopping section in engagement with the cut-out region prevents the inflator from rotating in a circumferential direction. Further, when the retainer is then secured to the case, the housing region and the retainer clamp the inflator on the upper circumferential planes and lower circumferential planes in the vicinities of the end areas, thus securing the inflator in a stable fashion.

The mounting of the inflator on the case merely uses the lateral movement stopping sections and the rotation stopping section, which are comprised of the sheet metal material extending from the mounting seats of the bottom wall of the case, and the retainer that serves to mounting of the airbag on the case as well. Therefore no separate mounting parts are required.

Further, the mounting work of the inflator is also simply done by storing the inflator in the housing region via the set-in opening such that the rotation stopping section engages with the cut-out region. If the retainer is then secured to the case, the inflator will be automatically mounted on the case together with the airbag.

Therefore, the airbag apparatus of the invention has a limited number of parts and facilitates the mounting work of the inflator on the case.

In the airbag apparatus of the invention, moreover, it is desired that the rotation stopping section includes a vertical plate region that is formed into a generally L shape extending from the mounting seat and bending downward, whereas the cut-out region of the inflator includes a flat surface that is parallel to the axial center of the inflator for engagement with the vertical plate region.

With this configuration, since the vertical plate region of the rotation stopping section has a wide flat surface for abutment against the flat surface of the cut-out region which is cut out along an up and down direction, the rotation stopping section will prevent the inflator from rotating in a steady fashion.

Furthermore, the case may be comprised of two separate parts; an upper part and a lower part. The upper part constitutes the circumferential wall and the mounting seats of the bottom wall including the lateral movement stopping sections and the rotation stopping section. The lower part is joined with the upper part on top planes of the mounting seats and constitutes the housing region.

In plastic working of a sheet metal into the case by stamping, if the mounting seats and the housing region are integral, the housing region must be processed by deep drawing. However, with the configuration described above, i.e., if the housing region and mounting seats are separate, the housing region may be easily formed by applying a bending work to a rectangular sheet metal and form it into a half pipe while leaving at front and rear ends thereof welding allowances to be spot-welded onto the mounting seats. This will facilitate the manufacturing of the case.

Further, if the welding allowances are spot-welded on the top planes of the mounting seats, leakage of an inflation gas from the welded region will be better prevented in comparison with an instance where the welding allowances are welded on undersides of the mounting seats.

Moreover, it will also be appreciated that the retainer includes at an inner edge of a mounting area thereof to the mounting seats of the case a gas shutting section that bends downward in order to shut up an inflation gas from flowing toward the hem of the opening of the airbag.

When the inflator emits an inflation gas, such a gas shutting section will prevent a hot inflation gas from directly hitting the opening hem of the airbag clamped between the retainer and mounting seats of the case, and will eventually prevent the gas from leaking from the airbag at vicinities of the mounting seats of the case.

The gas shutting sections can be easily formed by bending inner edges of front and rear sections of the retainer, and will not affect the location of the securing means such as bolts, which would be formed on front and rear regions, i.e., on the flat plate sections, of the retainer.

The vertical plate region of the rotation stopping region may be longer than the flat surface of the cut-out region in length in an up and down direction in order to abut against the flat surface over a wide area in an up and down direction.

It will also be appreciated that the cut-out regions are formed on two locations on an outer circumferential plane of a first end of the inflator whereas the case includes two rotation stopping sections so as to correspond to the two cut-out regions.

However, in order that the inflator is set in the case in correct orientation, it will be desired that the inflator has only one cut-out region on either front side or rear side of an either left or right end whereas only one rotation stopping section is formed to correspond to the only one cut-out region.

BRIEF DESCRIPTION OF DRAWINGS

FIG. 9 is a plan view of the case shown in FIG. 7; and

FIG. 10 is a sectional view of the airbag apparatus of FIG. 7, taken vertically along a front and rear direction of a vehicle.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
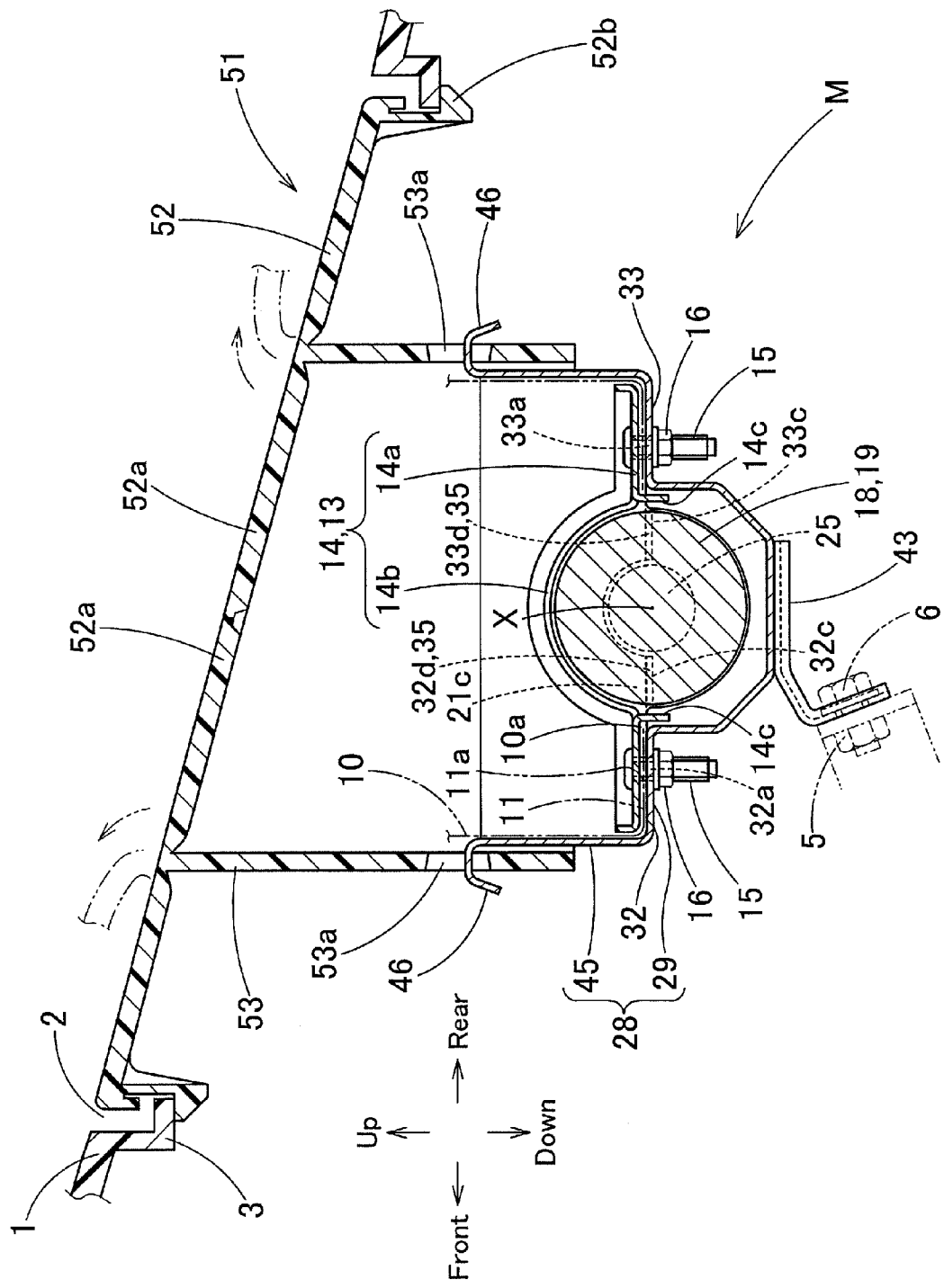
FIG. 1 is a sectional view of an airbag apparatus embodying the present invention on board, taken vertically along a front and rear direction of a vehicle.
Figure 2:
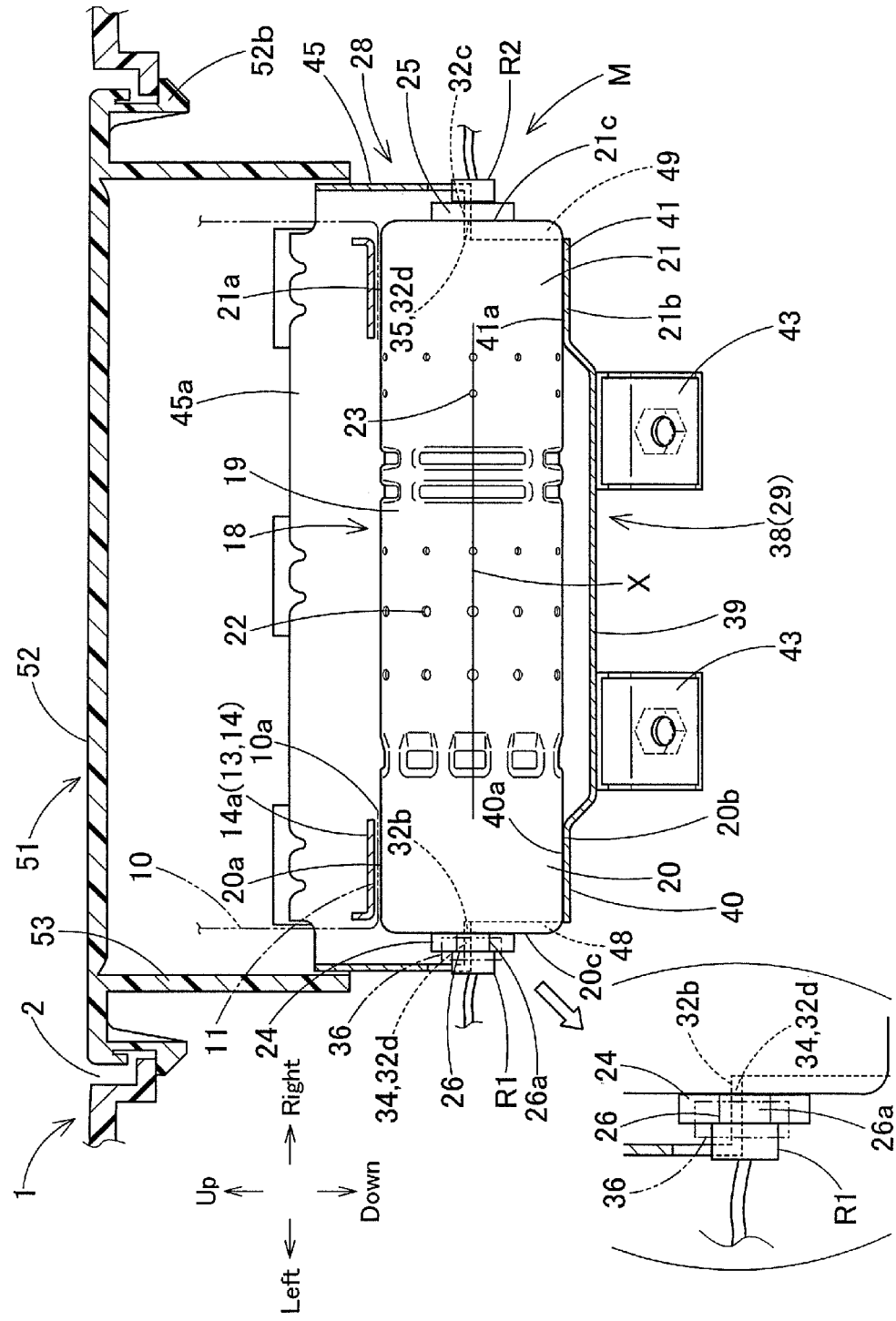
FIG. 2 is a sectional view of the airbag apparatus of FIG. 1, taken vertically along a left and right direction of a vehicle.

As shown in FIGS. 1 and 2, an airbag apparatus M for a front passenger's seat embodying the present invention is mounted on an instrument panel or a dashboard 1 of a vehicle, in front of a front passenger's seat. The airbag apparatus M includes an airbag 10, which is folded up, an inflator 18 for supplying the airbag 10 with an inflation gas, a case 28 that houses and holds the airbag 10 and the inflator 18, a retainer 13 that attaches the airbag 10 and inflator 18 to the case 28, and a cover 51 that covers the airbag 10. Although the cover 51 in this specific embodiment is so located as to lid an opening 2 formed on the dashboard 1, it may be integral with the dashboard 1.

Left/right directions in this specification are based on an axial direction of the inflator 18 housed in the case 28 whereas up/down directions are described assuming that the position of the inflator 18 relative to the case 28 is a lower position. In this specific embodiment, the left/right and up/down directions conform to left/right and up/down directions of a vehicle on which the airbag apparatus M is mounted. In this embodiment, moreover, front/rear directions also conform to front/ rear directions of the vehicle. However, these directions can be variable depending on actual mounting conditions on a vehicle.

Figure 3:
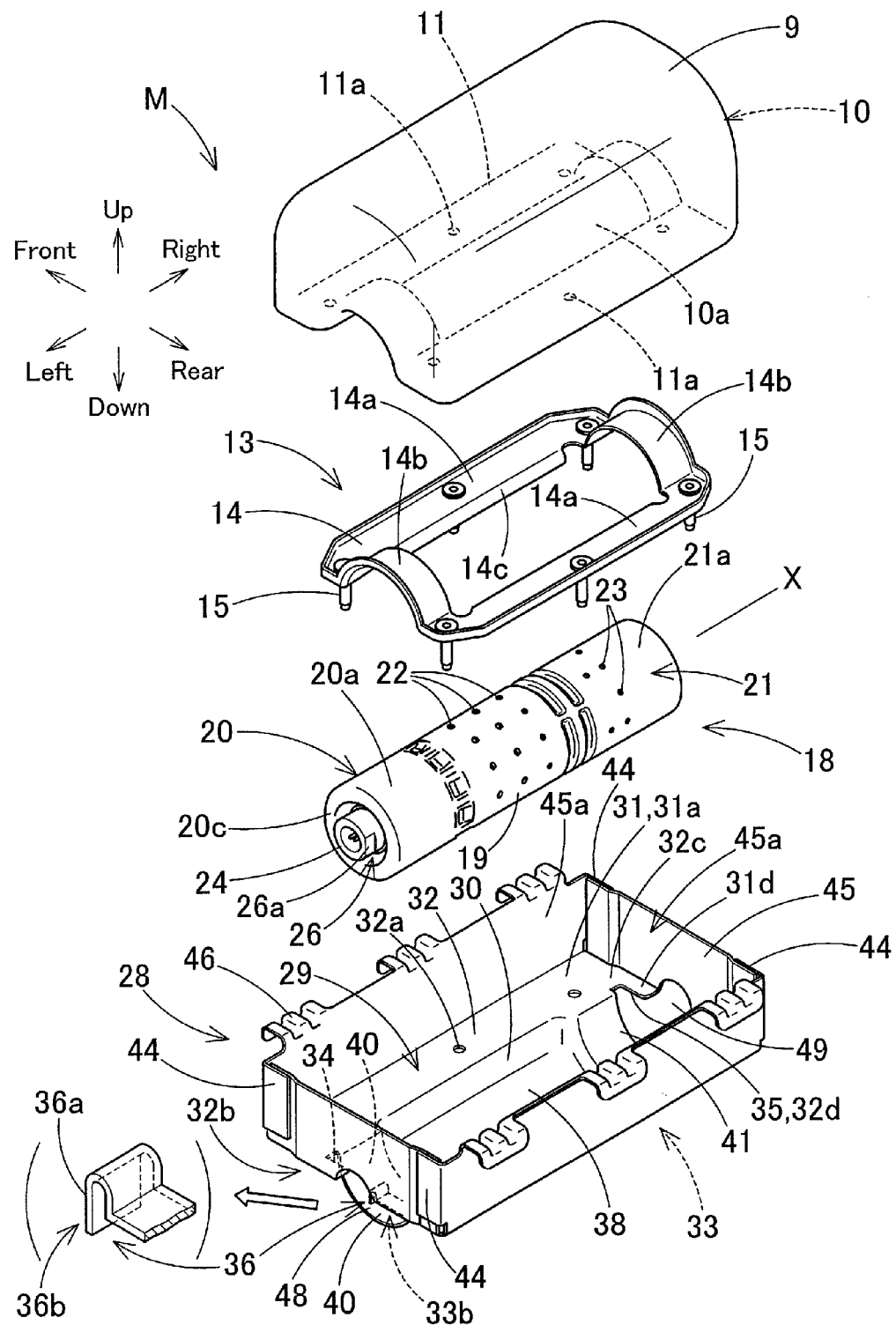
FIG. 3 is an exploded perspective view of the airbag apparatus of FIG. 1.

As shown in FIGS. 1 to 3, the airbag 10 is formed into a bag that has at the lower side a generally rectangular opening 10a for taking an inflation gas in. The airbag 10 is made of flexible fabric of polyester, polyamide or the like. A hem of the opening 10a is formed into a generally square ring according to a generally square annular figure of the retainer 13, and serves as a mounting area (or an opening hem) 11 to the case 28. The opening hem 11 is provided, at front and rear sides when on board, a plurality of (three, respectively, in this specific embodiment) mounting holes 11a used to attach the airbag 10 to the case 28.

Referring also to FIGS. 1 to 3, the retainer 13, which secures the airbag 10 to the case 28, is formed of sheet metal and includes a main body 14 having a generally square annular shape. The main body 14 includes at front and rear sides flat plate sections 14a according to flat figures of later-described mounting seats 32 and 33 of the case 28. On left and right sides of the main body 14 are curved sections 14b that are curved in a half-pipe fashion according to figures of later-described upper circumferential planes 20a and 21a of the inflator 18, in vicinities of end regions 20 and 21. Each of the flat plate sections 14a includes a plurality of (three, in the embodiment) bolts 15 extending downward, which bolts serve as securing means. The retainer 13 is housed inside the airbag 10 such that the bolts 15 project out of the mounting holes 11a, and the bolts 15 are put through later-described through holes 32a and 33a of the case 28 and nut 16 fastened. Thus the flat plate sections 14a are pressed against the mounting seats 32 and 33 of the case 28 whereas the curved sections 14b against the upper circumferential planes 20a and 21a of the inflator 18, respectively with the opening hem 11 of the airbag 10 clamped in between, such that the airbag 10 and inflator 18 are assembled with the case 28.

Additionally, the retainer 13 is provided, along the outer circumference, with an upswept rib (reference numeral omitted) for reinforcement.

The retainer 13 further includes, along the inner edges of mounting areas to the mounting seats 32 and 33 of the case 28, i.e., at the inner edges of the flat plate sections 14a, gas shutting sections 14c that are formed into bands bent downward toward a later-described housing region 38 of the case 28. The gas shutting sections 14c are provided in order to shut up an inflation gas flowing toward the opening hem 11 of the airbag 10 which is clamped between the flat plate sections 14a and mounting seats 32/33.

Referring to FIGS. 1 to 3 and 5A to 5C, the inflator 18 is cylindrical in contour and includes a columnar body 19 and connectors 24 and 25 that are located on end planes 20c and 21c of the end areas 20 and 21 of the body 19. The inflator 18 is housed in the case 28 with its axial center X extended horizontally, in a left and right direction. The connectors 24 and 25 are so allocated as to protrude from the end planes 20c and 21c of the inflator body 19, and lead wires R1 and R2 are connected respectively to the connectors 24 and 25 for feeding actuating signals. Specifically, the inflator body 19 includes in the central area gas discharge ports 22 for emitting a high-output inflation gas, and another gas discharge ports 23 for emitting low-output gas, in a vicinity of the first (right) end area 21. The lead wire R1 is connected to the connector 24 for feeding signals to emit the high-output gas out of the gas discharge ports 22, whereas the lead wire R2 is connected to the connector 25 for feeding signals to emit the low-output gas out of the gas discharge ports 23.

Figure 4:
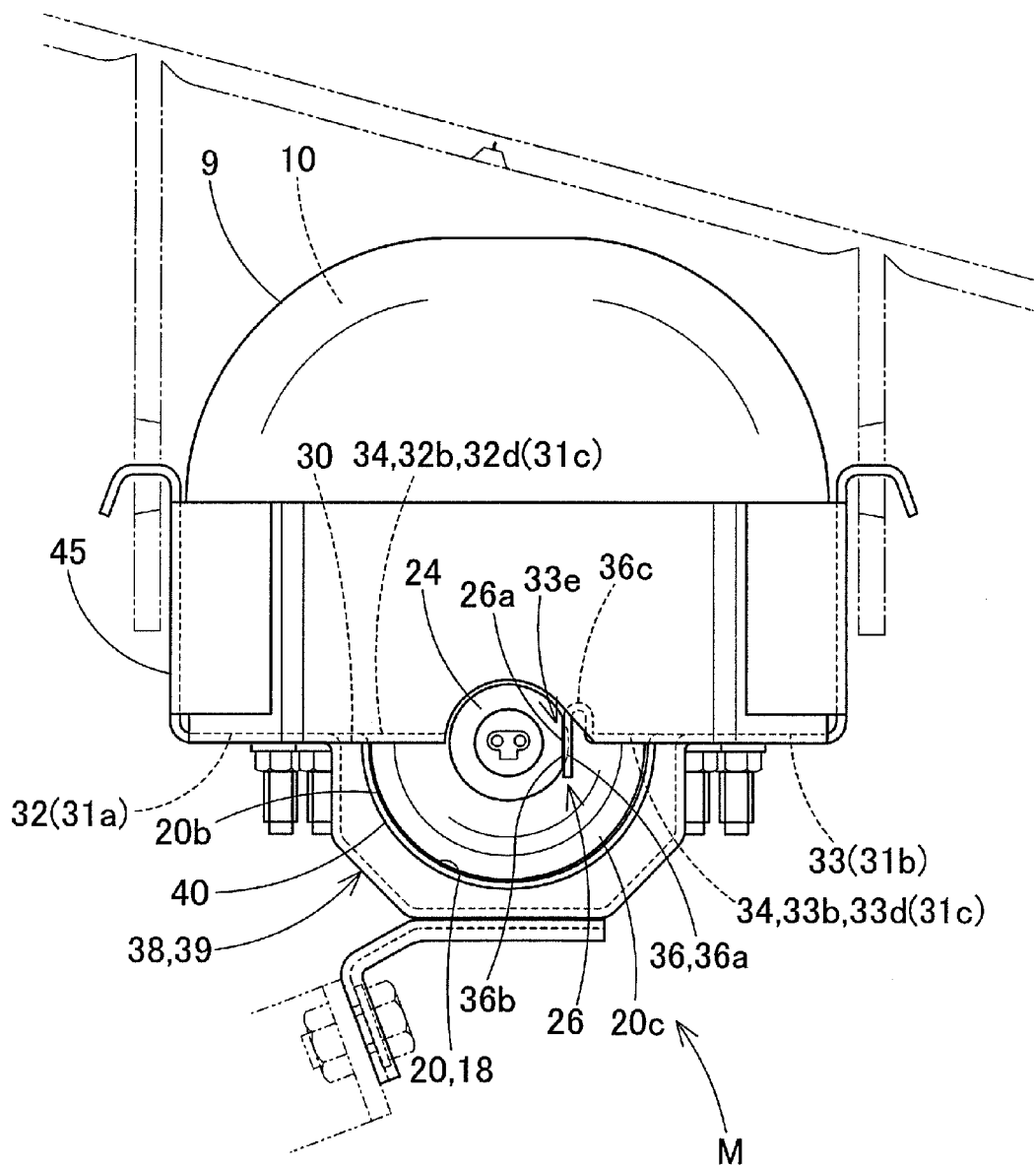
FIG. 4 is a side view of the airbag apparatus of FIG. 1.

As shown in FIGS. 2 to 4, a cut-out region 26 is formed on a rear side of the outer circumferential plane of the connector 24. The cut-out region 26 is formed along an up and down direction and has at the bottom, which is close to the axial center X of the inflator 18, a flat surface 26a that is parallel to the axial center X. Since the cut-out region 26 is formed along an up and down direction, the flat surface 26a is formed into a rectangular flat surface extending along an up and down direction and along a left and right direction, which is parallel to the axial center X.

The case 28 is formed of sheet metal into a top-open box that includes a bottom wall 29 and a circumferential wall 45 extending upward in a square tubular fashion from the outer periphery of the bottom wall 29, as shown in FIGS. 1 to 5C.

As shown in FIGS. 1, 2 and 4, the airbag 10 in a folded-up configuration is housed inside the circumferential wall 45. The circumferential wall 45 is provided at front and rear upper ends with a plurality of retaining lugs 46 to be inserted into retaining holes 53a formed on a side wall 53 of the cover 51 for retaining the side wall 53.

Referring to FIGS. 3, 5A, 5B and 5C, the bottom wall 29 includes a set-in opening 30 that is generally identical to an outer contour of the inflator 18 as laid along a left and right direction and viewed from above, and a housing region 38 that is recessed in a generally half-pipe fashion from front and rear peripheries of the set-in opening 30 for receiving the inflator 18.

More specifically, the housing region 38 is so formed as to connect a front region 31a and a rear region 31b of the periphery 31 of the set-in opening 30 for housing a generally lower half of the inflator 18. The housing region 38 includes at left and right ends support regions 40 and 41 that support lower circumferential planes 20b and 21b of the end areas 20 and 21 of the inflator 18 with the inner surfaces 40a and 41a. Between the support regions 40 and 41 are a large-diameter region 39 that is formed into a generally half pipe (more specifically, a generally octagonal pipe) with a larger diameter than that of the support regions 40 and 41 in order to surround the gas discharge ports 22 and 23 of the inflator 18 at a distance.

The support regions 40 and 41 are located directly below the curved sections 14b of the retainer 13 when the inflator 18 is assembled with the case 28.

The housing region 38 is further provided at left and right ends with open regions 48 and 49 that are formed by outcutting and allow opposite end planes of the inflator 18 to be exposed. The open regions 48 and 49 extend up to left and right walls of the circumferential wall 45 (FIG. 3).

The front and rear peripheries of the set-in opening 30, i.e., the front region 31a and rear region 31b of the periphery 31 of the set-in opening 30, serve as mounting seats 32 and 33 for the airbag 10, as described above, which have flat surfaces extending horizontally in a left and right direction. The mounting seats 32 and 33 have through holes 32a and 33a for receiving the bolts 15 of the retainer 13.

The bottom wall 29 of the case 28 further includes lateral movement stopping sections 34 and 35 that prevent the inflator 18 from moving in an axial direction or in a left and right direction, and a rotation stopping section 36 that prevents the inflator 18 from rotating in a circumferential direction about the axial center X.

The lateral movement stopping sections 34 and 35 are provided for keeping the opposite end planes 20c and 21c of the inflator 18 set in the housing region 38 from moving, and are located on end planes 32d and 33d of sheet metal material extending from the mounting seats 32 and 33 at left and right peripheries of the set-in opening 30 of the bottom wall 29.

That is, the lateral movement stopping section 34 is comprised of end planes 32d and 33d, facing toward the right, of left extended regions 32b and 33b extending from the mounting seats 32 and 33 in a left region 31c of the periphery 31 of the set-in opening 30. The lateral movement stopping section 35 is comprised of end planes 32d and 33d, facing toward the left, of right extended regions 32c and 33c extending from the mounting seats 32 and 33 in a right region 31d of the periphery 31 of the set-in opening 30.

The lateral movement stopping sections 34 and 35 are merely formed on the extended regions 32b, 32c, 33b and 33c extending from the mounting seats 32 and 33. The extended regions 32b, 32c, 33b and 33c are comprised of the same sheet metal material as the mounting seats 32 and 33, i.e., are integral with the mounting seats 32 and 33, not joined by welding or the like.

Figure 5A:
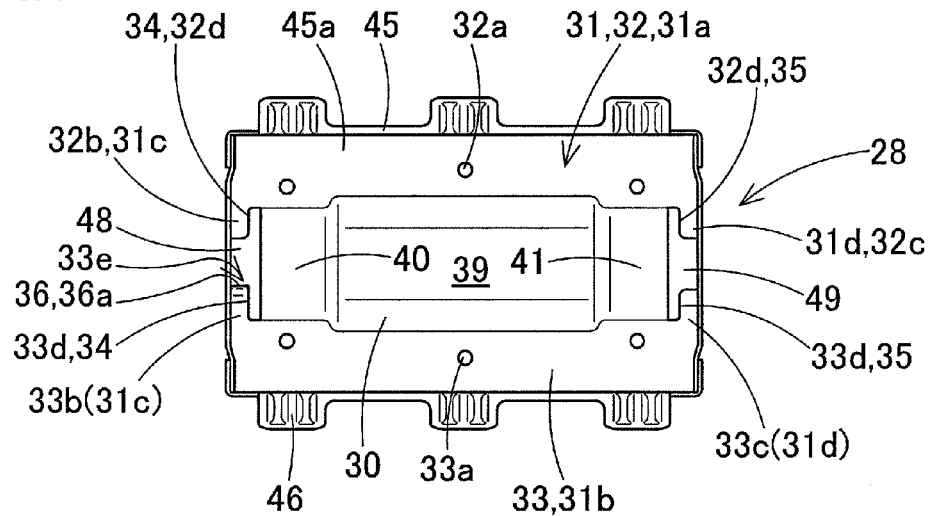
FIG. 5A is a plan view of a case of the airbag apparatus of FIG. 1.

As shown in FIGS. 3, 4 and 5A, the rotation stopping section 36 is so formed as to enter into and be engaged with the cut-out region 26 of the inflator 18. It is formed on a forward-facing inner edge 33e of the left extended region 33b, which is comprised of the sheet metal region extending from the mounting seat 33, in at least either left or right periphery of the set-in opening 30. That is, the rotation stopping section 36 is located at the inner edge 33e of the left region 31c of the periphery 31 of the set-in opening 30. In this specific embodiment, the rotation stopping section 36 is formed into such a generally L shape that bends downward and forward from the inner edge 33e of the left region 31c. The bent region or vertical plate region 36a abuts against the flat surface 26a of the cut-out region 26 by its front surface or inner surface 36b.

The housing region 38 of the case 28 further includes mounting brackets 43 for mounting the airbag apparatus M on mounting bases 5 of a vehicle body structure with bolts 6, as shown in FIGS. 1 and 2.

Referring to FIGS. 1 and 2, the cover 51 is fabricated of such thermo-plastic elastomer as polyolefin, polyester, or the like, and includes a generally rectangular ceiling wall 52 that covers the case 28 above the circumferential wall 45 and a side wall 53 extending downward from the peripheral edge of the ceiling wall 52 in a generally square tubular fashion. The ceiling wall 52 includes in the area encompassed by the side wall 53 two doors 52a that are openable respectively forward and rearward at airbag deployment. Around the doors 52a is a thinned rupturable portion (reference numeral omitted). The ceiling wall 52 further includes retaining legs 52b for engagement with a flange 3 formed on a peripheral edge of the opening 2 of the dashboard 1. The side wall 53 is provided, on the front and rear sides, with a plurality of (three, respectively, in the illustrated embodiment) retaining holes 53a, which run through in a front and rear direction, for receiving the retaining lugs 46 of the case 28, as described above.

Manufacturing of the airbag apparatus M is now described as well as subsequent on-board mounting work. Firstly the retainer 13 is housed inside the airbag 10 and allocated on the opening hem 11 such that the bolts 15 project out of the mounting holes 11a, and then the airbag 10 is folded up. The airbag 10 is then wrapped up by a tearable wrapping sheet 9 for keeping the folded-up configuration.

Figure 5B:
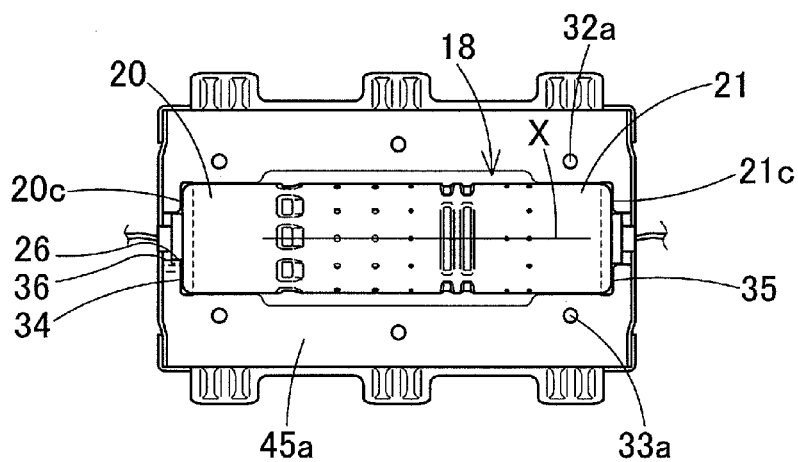
FIG. 5B is a plan view of the case which houses an inflator.
Figure 5C:
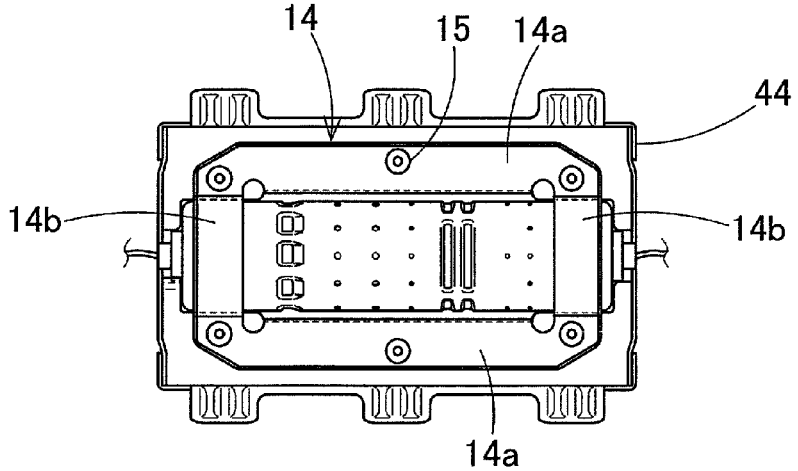
FIG. 5C is a plan view of the case with which a retainer is additionally assembled.

Referring to FIGS. 5A and 5B, the inflator 18 is so arranged, relative to the case 28, to have the end area 20 on the left side whereas the end area 21 on the right side, and set in the housing region 38 of the bottom wall 29 of the case 28 via an opening 45a (FIG. 3) of the circumferential wall 45 such that rotation stopping section 36 enters into the cut-out region 26. Subsequently, the retainer 13 allocated on the opening hem 11 of the airbag 10 is set in the case 28 from above such that the bolts 15 go through the through holes 32a and 33a.

Then if the bolts 15 are fastened with the nuts 16 while the retainer 13 presses a square annular mounting area in the opening hem 11 of the airbag 10 against the upper circumferences 20a and 21a of the inflator 18 in the vicinities of the end areas 20 and 21 and the mounting seats 32 and 33 of the case 28, the retainer 13 is secured to the mounting seats 32 and 33, and the airbag 10 and inflator 18 are assembled with the case 28 (FIGS. 1, 2 and 5B).

When the inflator 18 is set in the housing region 38, the lateral movement stopping sections 34 and 35 provided on the bottom wall 29 of the case 28 restrain the opposite end planes 20c and 21c of the inflator 18 and prevent the inflator 18 from moving in an axial direction, whereas the rotation stopping section 36 in engagement with the cut-out region 26 prevents the inflator 18 from rotating in a circumferential direction. Further, when the retainer 13 is then secured to the case 28, the inner surfaces 40a and 41a of the support regions 40 and 41 in the housing region 38 and undersides of the curved sections 14b of the retainer 13 clamp the inflator 18 on the upper circumferential planes 20a and 21a and lower circumferential planes 20b and 21b in the vicinities of the end areas 20 and 21, thus securing the inflator 18 in a stable fashion.

Although FIGS. 1 and 2 depict narrow clearances between the upper circumferential planes 20a and 21a of the inflator 18 and the curved sections 14b of the retainer 13, and between the lower circumferential planes 20b and 21b of the inflator 18 and the inner surfaces 40a and 41a of the support regions 40 and 41, these clearances are for illustrative purposes only. Actually, almost no clearances are provided, with the opening hem 11 of the airbag 10 is disposed in between.

The mounting of the inflator 18 on the case 28 merely uses the lateral movement stopping sections 34 and 35 and the rotation stopping section 36, which are comprised of the sheet metal material extending from the mounting seats 32 and 33 of the bottom wall 29 of the case 28, and the retainer 13 that serves to mounting of the airbag 10 on the case 28 as well. Therefore no separate mounting parts are required.

The mounting work itself is also simply done by storing the inflator 18 in the housing region 38 via the set-in opening 30 such that the rotation stopping section 36 engages with the cut-out region 26. If the retainer 13 is then secured to the case 28, the inflator 18 is automatically mounted on the case 28 together with the airbag 10.

Therefore, the airbag apparatus M has a limited number of parts and facilitates the mounting work of the inflator 18 on the case 28.

Although each of the lateral movement stopping sections 34 and 35 of this embodiment is comprised of the end plane 32d/33d having a thickness of the bottom wall 29 in the periphery of the set-in opening 30, the lateral movement stopping section may also be formed longer in an up and down direction than the thickness of the bottom wall 29, by applying bending work to the hem of the set-in opening 30, so as to support the end planes 20c and 21c of the inflator 18 better.

Thereafter, the side wall 53 of the cover 51 is mounted around the circumferential wall 45 of the case 28 to insert the retaining lugs 46 into the retaining holes 53a. Thus the airbag apparatus M is completed.

The completed airbag apparatus M is then set inside the dashboard 1 of a vehicle via the opening 2, and the retaining legs 52b of the cover 51 are engaged with the flange 3 of the dashboard 1. Then the mounting brackets 43 are secured to the mounting bases 5 with the bolts 6, whereas the lead wires R1 and R2 are connected to the connectors 24 and 25, respectively. Thus the airbag apparatus M is mounted on a vehicle.

After the airbag apparatus M is mounted on board, if the inflator 18 emits an inflation gas from the gas discharge pots 22 and 23, the airbag 10 is inflated and tears the wrapping sheet 9, then pushes and opens the doors 52a of the cover 51, and emerges from the opening 45a of the case 28.

In addition to the advantages of reducing the number of parts and facilitating the mounting work of the inflator 18 to the case 28, the airbag apparatus M has following advantageous effects.

The retainer 13 includes at the inner edge of the mounting area to the mounting seats 32 and 33 of the case 28, i.e., at the inner edges of the flat plate sections 14a, the gas shutting sections 14c that bend downward in order to shut up an inflation gas from flowing toward the opening hem 11 of the airbag 10.

When the inflator 18 emits an inflation gas, the gas shutting section 14c will prevent the hot gas from directly hitting the opening hem 11 of the airbag 10 clamped between the retainer 13 and mounting seats 32 and 33 of the case 28, and eventually prevent the gas from leaking from the airbag 10 at vicinities of the mounting seats 32 and 33 of the case 28.

Especially in this embodiment, the housing region 38 of the case 28 is provided, between the support regions 40 and 41, the large-diameter region 39 that receives an inflation gas emitted from numerous gas discharge ports 22 and 23 and lets it blow toward the opening 45a of the circumferential wall 45, and the gas exits from the gas discharge ports 22 and 23 in directions perpendicular to the axial direction of the inflator 18. With this configuration, a part of the inflation gas would flow directly at a region of the airbag 10 between the flat plate sections 14a of the retainer 13 and mounting seats 32 and 33, without any means for preventing it. The gas shutting sections 14c, however, will protect the opening hem 11 of the airbag 10, i.e., the region of the airbag 10 between the flat plate sections 14a of the retainer 13 and mounting seats 32 and 33, from such an inflation gas.

The gas shutting sections 14c can be easily formed by bending inner edges of the front and rear sections of the retainer 13, and will not affect the location of the bolts 15 formed on the flat plate sections 14a of the retainer 13 as securing means.

In the airbag apparatus M, moreover, the rotation stopping section 36 includes at the left extended region 33b, which extends from the mounting seat 33, the vertical plate region 36a formed into such a generally L shape that bends downward, whereas the cut-out region 26 of the inflator 18 includes the flat surface 26a that is parallel to the axial center X of the inflator 18 for engagement with the front surface 36b of the vertical plate region 36a.

With this configuration, since the vertical plate region 36a has a wide flat surface for abutment against the flat surface 26a of the cut-out region 26 which is cut out along an up and down direction, the rotation stopping section 36 will prevent the inflator 18 from rotating in a steady fashion.

In the foregoing embodiment, especially, the vertical plate region 36a is so formed as to rise once from the left extended region 33b and then fall, in other words has the top end 36c high and is therefore longer than the flat surface 26a in an up and direction. This configuration will further enhance rotation lock of the inflator 18, since the vertical plate region 36a abuts against the flat surface 26a of the cut-out region 26 with a wider area.

Figure 6A:
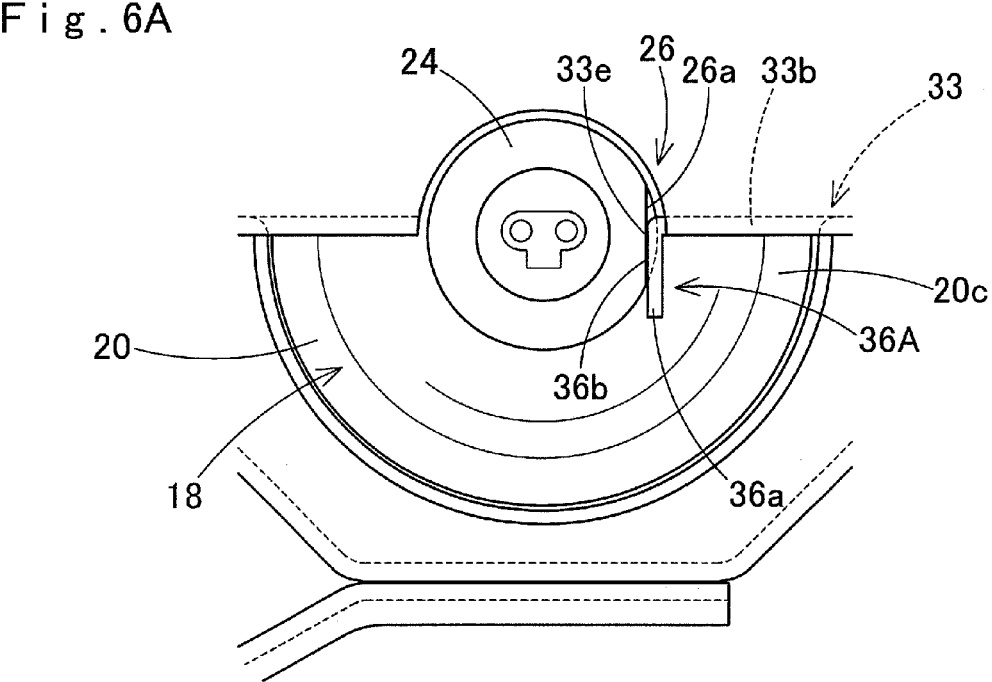
FIGS. 6A and 6B are side views of alternative embodiments of a rotation stopping section.
Figure 6B:
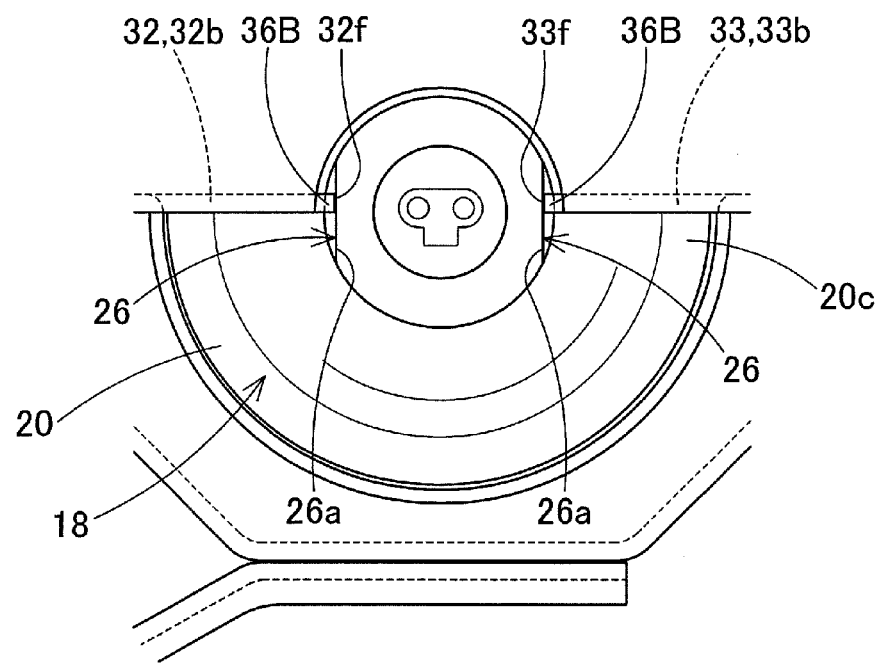
Figure 7:
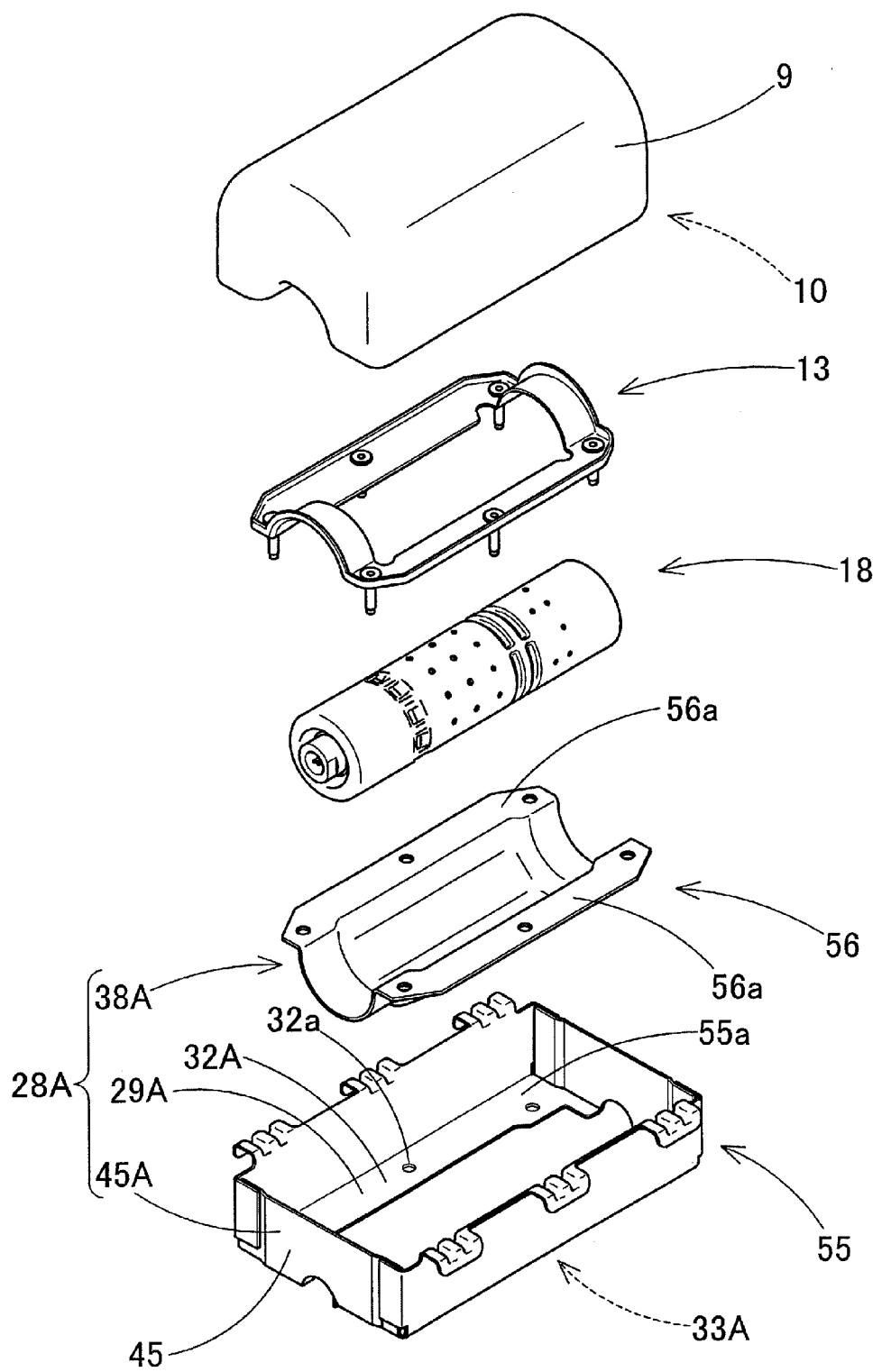
FIG. 7 is an exploded perspective view of another alternative embodiment of the airbag apparatus.
Figure 8:
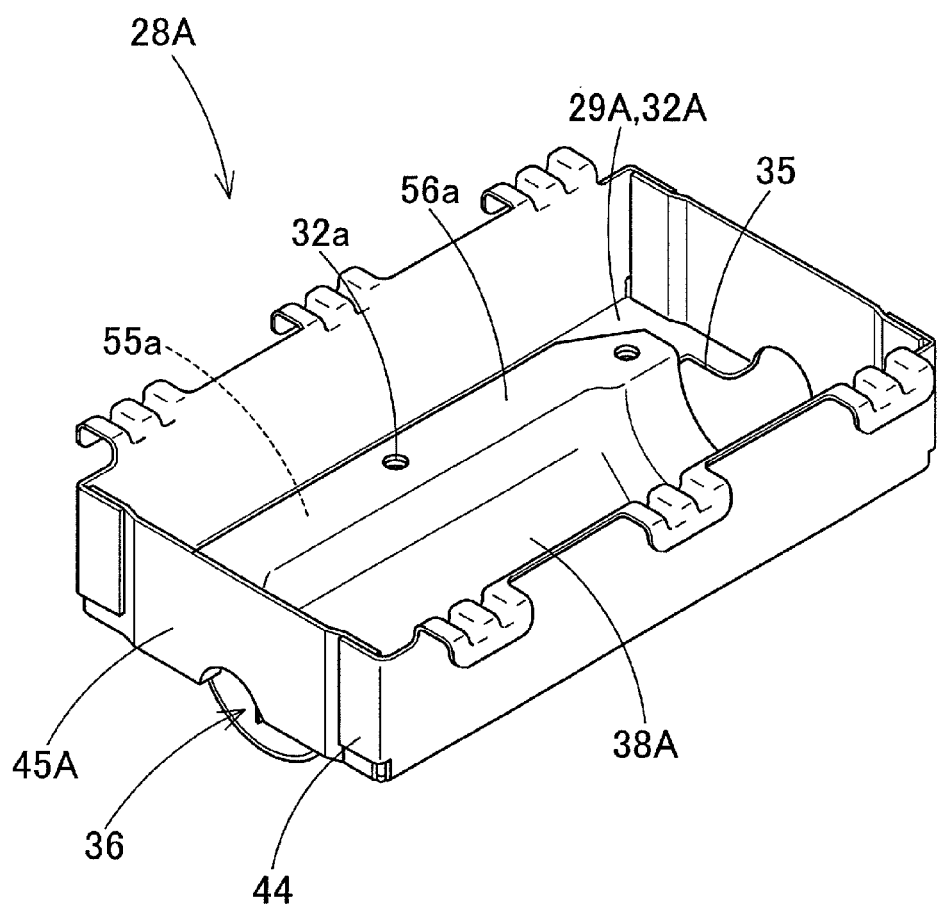
FIG. 8 is a perspective view of a case shown in FIG. 7.

If such an advantageous effect does not have to be considered, the following configurations may alternatively be adopted. A rotation stopping section 36A shown in FIG. 6A is formed into a L-shape bending downward from the left extended region 33b. Another rotation stopping section 36B shown in FIG. 6B is comprised of an end plane 33f of the forward-facing left extended region 33b.

The rotation stopping section may also be configured as follows: As shown in FIG. 6B, two rotation stopping sections 36B are provided to correspond to two cut-out regions 26 formed on an outer circumferential plane of either left or eight end of the inflator 18. The rotation stopping section may also be so formed as to correspond to each one or two cut-out region(s) formed on both ends of the inflator 18.

However, if the inflator 18 should be housed in the case 28 with the left and right ends 20 and 21 located at predetermined positions in a left and right direction and with the upper circumferential planes 20a and 21a definitely facing upward, it will be desired that the inflator 18 has only one cut-out region 26 on either front side or rear side of an either left or right end whereas only one rotation stopping section 36 is formed to correspond to the only one cut-out region 26, such that an assembly error may not occur.

Furthermore, in the foregoing embodiment, the case 28 having the bottom wall 29 and circumferential wall 45 is fabricated of a single sheet-metal material. As shown in FIG. 3, the circumferential wall 45 is formed into a square tubular shape by raising four tongues extending in four directions from the bottom wall 29, and by spot-welding welding allowances 44 of the tongues. In the bottom wall 29, the housing region 38 is formed by drawing whereas the open regions 48 and through holes 32a and 33a are punched out.

However, as a case 28A shown in FIGS. 7 to 10, the case may be comprised of two separate parts, i.e., an upper part 55 that constitutes the circumferential wall 45 and mounting seats 32A and 33A of a bottom wall 29A including lateral movement stopping sections 34 and 35 and a rotation stopping section 36, and a lower part 56 that is joined with the upper part 55 on top planes 55a of the mounting seats 32A and 33A and constitutes the housing region 38A.

In plastic working a sheet metal into the case by stamping, if the mounting seats 32 and 33 and the housing region 38 are integral as in the case 28 of the foregoing embodiment, the housing region 38 must be processed by deep drawing. However, with the configuration described above, i.e., if the housing region 38A and mounting seats 32A and 33A are separate, the housing region 38A may be easily formed by applying a bending work to a rectangular sheet metal and form it into a half pipe while leaving at front and rear ends welding allowances 56a to be spot-welded onto the mounting seats 32A and 33A. This will facilitate the manufacturing of the case 28A.

Further, in the case 28A, the welding allowances 56a are spot-welded on the top planes 55a of the mounting seats 32A and 33A. This configuration will better prevent an inflation gas leakage from the welded region, in comparison with an instance where the welding allowances 56a are welded on undersides of the mounting seats 32A an 33A.

What is claimed is:

1. An airbag apparatus for a front passenger's seat of a vehicle, the apparatus comprising:
   an airbag including a generally rectangular opening for taking inflation gas therein;
   an inflator that is cylindrical in contour and feeds the airbag with the inflation gas, the inflator including on an outer circumferential plane of a vicinity of an end plane thereof a cut-out region which is cut out along an up and down direction;
   a case for housing the airbag and the inflator, the case being made of sheet metal and formed into a top-open box that includes a bottom wall and a circumferential wall extending in a tubular fashion from an outer peripheral edge of the bottom wall, wherein the bottom wall includes:
a set-in opening that is opened in a generally identical contour to an outer contour of the inflator as laid along a left and right direction and viewed from above;
a housing region that houses the inflator, the housing region being recessed from front and rear peripheries of the set-in opening in a generally half-pipe fashion and supporting lower circumferential planes of opposite ends of the inflator with left and right end regions of inner surfaces of the housing region;
mounting seats of the airbag, the mounting seats being located in the front and rear peripheries of the set-in opening;
lateral movement stopping sections that position opposite end planes of the inflator set in the housing region and prevent the inflator from moving in an axial direction, the lateral movement stopping sections being located on end planes of sheet metal material extending from the mounting seats at left and right peripheries of the set-in opening; and
a rotation stopping section that prevents the inflator from rotating in a circumferential direction about an axial center, the rotation stopping section being comprised of a sheet metal region extending from one of the mounting seats in at least either left or right periphery of the set-in opening, for engagement with the cut-out region of the inflator; and
a retainer that secures the airbag and inflator to the case, the retainer being generally square annular in contour and including flat plate sections that are located at front and rear sides and formed respectively into a flat plate according to contour of the mounting seats of the case, and curved sections that are located on left and right sides and curved according to figures of upper circumferential planes of vicinities of opposite end regions of the inflator, such that the retainer is mounted on the mounting seats with securing means while pressing a generally square annular mounting area in a hem of the opening of the airbag against the upper circumferential planes of the vicinities of the opposite end regions of the inflator and the mounting seats of the case, wherein
the lateral movement stopping sections regulate a position of the opposite end planes of the inflator only by storing the inflator in the housing region of the bottom wall of the case from above via an opening of the circumferential wall of the case, and
the rotation stopping section is engaged with the cut-out region of the inflator so as to prevent the inflator from rotating only by storing the inflator in the housing region of the bottom wall of the case from above via the opening of the circumferential wall of the case.

2. The airbag apparatus according to claim 1, wherein:
the rotation stopping section includes a vertical plate region that is formed into a generally L shape extending from the one of the mounting seats and bending downward; and
the cut-out region of the inflator includes a flat surface that is parallel to the axial center of the inflator for engagement with the vertical plate region.

3. The airbag apparatus according to claim 1, wherein the case is comprised of two separate parts; an upper part that constitutes the circumferential wall and the mounting seats of the bottom wall including the lateral movement stopping sections and the rotation stopping section, and a lower part that is joined with the upper part on top planes of the mounting seats and constitutes the housing region.

4. The airbag apparatus according to claim 1, wherein the retainer includes at an inner edge of a mounting area thereof to the mounting seats of the case a gas shutting section that bends downward in order to shut up an inflation gas from flowing toward the hem of the opening of the airbag.

5. The airbag apparatus according to claim 2, wherein the vertical plate region of the rotation stopping region is longer than the flat surface of the cut-out region in length in an up and down direction and abuts against the flat surface.

6. The airbag apparatus according to claim 1, wherein:
the cut-out regions are formed on two locations on an outer circumferential plane of a first end of the inflator; and
the case includes two of the rotation stopping sections so as to correspond to the two cut-out regions.

7. The airbag apparatus according to claim 1, wherein:
the inflator includes only one cut-out region on either front or rear side of either left or right end thereof; and
the case includes only one rotation stopping section so as to correspond to the only one cut-out region.

8. The airbag apparatus according to claim 2, wherein the vertical plate region of the rotation stopping section includes on an inner side facing toward the inflator a flat surface for abutment against the flat surface of the cut-out region of the inflator so as to prevent the inflator from rotating.

* * * * *